United States Patent
Malaviya

(10) Patent No.: US 7,770,056 B2
(45) Date of Patent: Aug. 3, 2010

(54) SYSTEM AND METHOD FOR DYNAMIC PAGE CLASSIFICATION FOR MEMORY DUMPING

(75) Inventor: Ajit Malaviya, Bangalore Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 400 days.

(21) Appl. No.: 11/873,713

(22) Filed: Oct. 17, 2007

(65) Prior Publication Data

US 2008/0098209 A1 Apr. 24, 2008

(30) Foreign Application Priority Data

Oct. 18, 2006 (IN) .................. 1919/CHE/2006

(51) Int. Cl.
*G06F 11/00* (2006.01)
(52) U.S. Cl. ............................................ 714/5; 714/15
(58) Field of Classification Search .................. 714/45, 714/15, 5, 13, 54; 713/2; 711/161, 162
See application file for complete search history.

(56) References Cited

U.S. PATENT DOCUMENTS

| | | | | |
|---|---|---|---|---|
| 4,458,307 A | * | 7/1984 | McAnlis et al. | 714/22 |
| 5,293,612 A | * | 3/1994 | Shingai | 711/159 |
| 7,290,175 B1 | * | 10/2007 | Kessler et al. | 714/37 |
| 7,509,521 B2 | * | 3/2009 | Iwakura et al. | 714/5 |
| 2003/0009640 A1 | * | 1/2003 | Arimilli et al. | 711/147 |

* cited by examiner

*Primary Examiner*—Dieu-Minh Le

(57) ABSTRACT

A technique for creating memory page classification that improves memory dumping efficiency. In one example embodiment, this is accomplished by creating DPCs that substantially maps to operational hierarchy of kernel that includes modules/sub-systems that can allocate and manage the kernel. One or more DPCs associated with the kernel's modules/sub-systems that needs to dumped is then determined upon receiving a computer system panic condition. The memory pages associated with the one or more DPCs are then dumped to an external memory based on the determination.

20 Claims, 4 Drawing Sheets

SYSTEM AND METHOD FOR DYNAMIC PAGE CLASSIFICATION FOR MEMORY DUMPING

RELATED APPLICATIONS

The present application is based on, and claims priority from, Indian Application Number 1919/CHE/2006, filed Oct. 18, 2006, the disclosure of which is hereby incorporated by reference herein in its entirety.

BACKGROUND OF THE INVENTION

Operating systems typically are configured to perform memory dumps upon the occurrence of system crashes and serious failures involving hung user processes and services. A memory dump comprises copying the contents of main memory to an external storage, for example, in the form of a file stored on a hard disk or other secondary storage medium. In the case of a system crash, a memory dump typically must be followed by a reboot of the system. Currently, full memory dumps are indispensable resources for the analysis and correction of problems related to crashes and for development of reliable systems.

Writing data from main memory to a hard disk is a relatively slow operation. In the case of a full memory dump, the system must scan the entire contents of memory and write contents to the external storage. Thus, the principal drawback to generating a full memory dump is the length of "down time" it entails for the system, during which the system is effectively unusable for other purposes. This downtime is a function of the onboard memory size and, where a system reboot is required, the speed of the boot storage device. Writing 256 gigabytes of memory to disk, for example, can take more than an hour to complete. For a computer system with terabytes range of memory, generating a full memory dump can take several hours.

In some systems, each of the physical memory pages is assigned to one of several specific page classes. For example, a physical memory page that contains the kernel code can belong to a specific page class. By dividing the physical memory in the computer system into different page classes, it becomes possible to only dump those parts of the memory that are most useful for debugging a problem. However, this solution still requires dumping all the memory pages of a selected class, which can still be a very time consuming task. Furthermore, in systems with very large memory, there is a good chance that each page class becomes larger over time, thereby increasing the time needed to dump even a few page classes

BRIEF DESCRIPTION OF THE DRAWINGS

Embodiments of the invention will now be described, by way of example only, with reference to the accompanying drawings in which.

DETAILED DESCRIPTION OF THE INVENTION

In the following detailed description of the various embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

The term "computer system panic" refers to a condition, found by a sub-system in the kernel, at which the computer system cannot make progress in any reliable manner. This can be due to data structure corruption, lack of sufficient resources to process a request, an invalid/unexpected request, and so on.

As will be explained in more detail in what follows, the present technique allows dynamic creation of page classes. The term "DPC (Dynamic Page Class)" refers to a page class that is dynamically created by a sub-system. It can be a top level page class or a sub-class of an existing or new class. In addition, the terms "module", "sub-system", "module/sub-system", and "kernel module/sub-system" are used interchangeably throughout the document. Also, the term "page classification" refers to a mechanism by which a physical memory page is assigned to a page class. This can include changing the page class association with a memory page.

The present technique creates DPCs and uses them to improve the memory dump efficiency. In one example embodiment, the present technique uses the operational hierarchical nature of the kernel architecture to create the DPCs to improve memory dump efficiency during a computer system panic condition.

Figure 1:
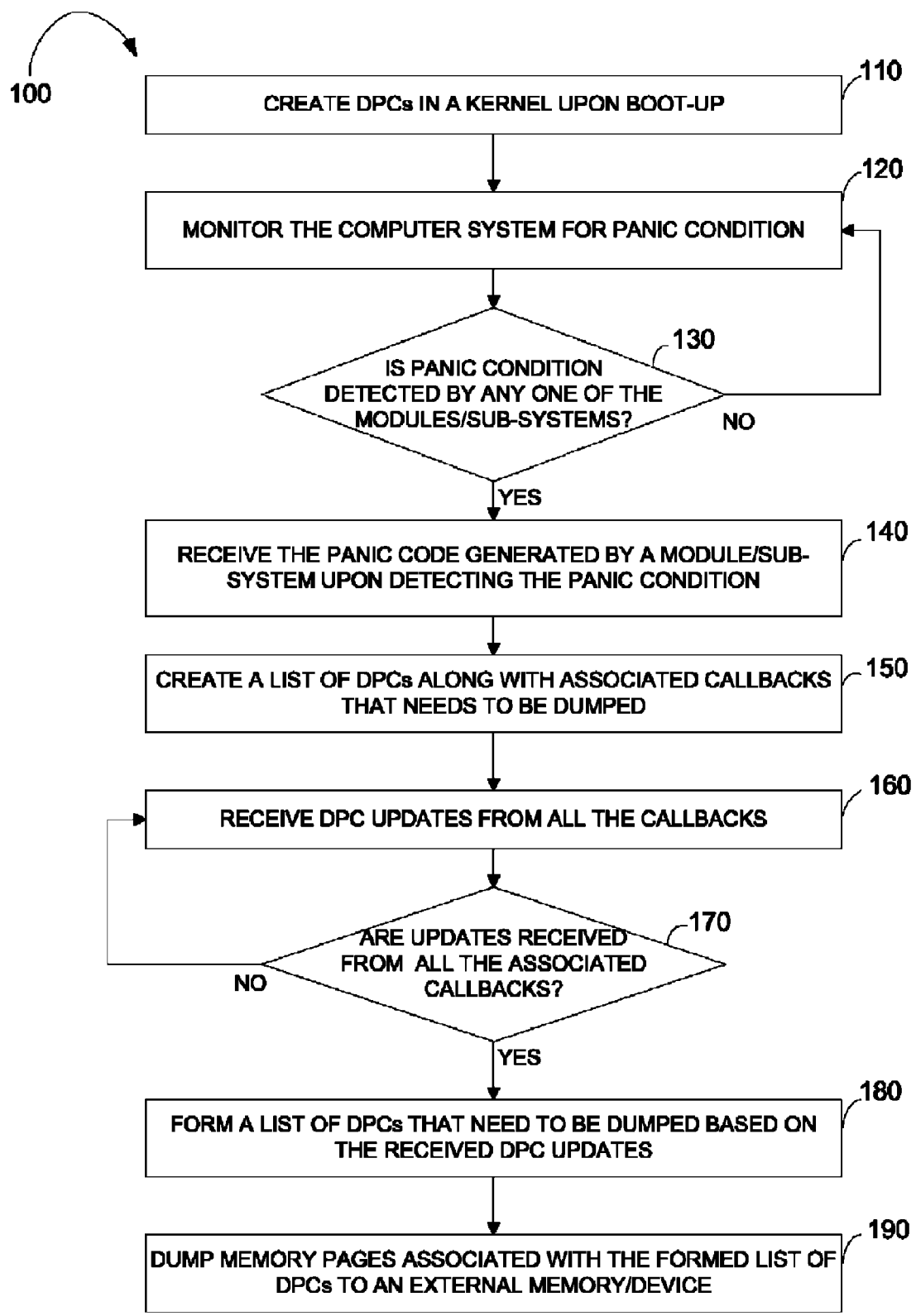
FIG. 1 is a flowchart illustrating a method for dynamic memory page classification according to an embodiment of the present subject matter.

FIG. 1 illustrates an example method 100 for dynamic page classification to improve memory dump efficiency. At step 110, this example method 100 begins by creating DPCs by a subsystem in the kernel upon boot-up. In some embodiments, the some page classes may be created by the dump sub-system in the kernel upon the computer system boot-up such that they substantially map to the operational hierarchy of the kernel. In these embodiments, the page classes substantially reflect logical and/or physical relationship of kernel modules/sub-systems. The dump sub-system is a sub-system that resides in the kernel that exports the page classification mechanism to the rest of the computer system as will be described below. In these embodiments, during operation and/or upon boot-up, the dump sub-system can dynamically create DPCs based on requests received from other kernel sub-systems.

For example, a typical operating system can include sub-systems in the kernel, such as file system, virtual memory, buffer cache and so on. The file system can be further divided into smaller modules, such as virtual file system layer, buffer cache, HFS (hierarchical file system), NFS (network file system) and so on. The virtual memory system in the operating system can be sub-divided into lower level services, such as translation management, memory allocation, physical page management, swap management and so on. Similarly, the buffer cache in the operating system can be divided into sub-layers, such as interface module, memory allocation module, Input/Output (I/O) layer and so on. In some embodiments, the DPCs are predefined to follow such kernel hierarchy to improve memory dump efficiency.

Figure 3:
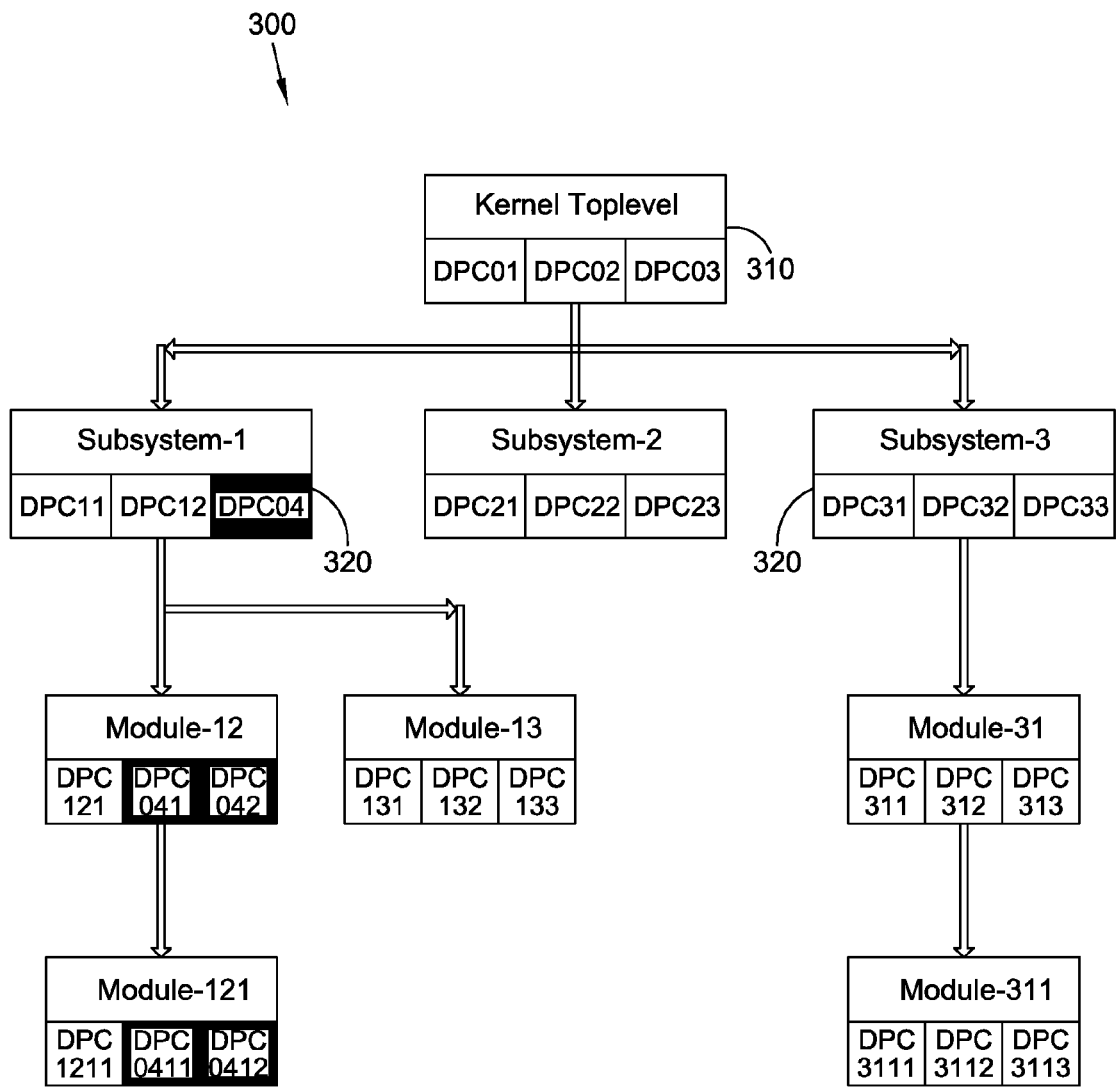
FIG. 3 is a block diagram that shows kernel module/sub-system and its associated DPC hierarchy according to an embodiment of the present subject matter.

FIG. 3 shows a typical operational hierarchy of a well-defined kernel 300 in an operating system. As shown in FIG. 3, the kernel 300 has a top level system 310 and associated modules/sub-systems 320. It can be seen in FIG. 3 that the kernel 300 is organized in a hierarchical manner. Each level in the kernel hierarchy can have its own associated data and they are shown as DPCs. The DPC number included with each DPC is shown in FIG. 3 for illustrative purposes only. It can be seen in FIG. 3 that the data hierarchy follows the kernel module hierarchy. However, for practical reasons each module can request creation of its own top level DPC and its associated hierarchy. For example, it can be seen in FIG. 3 that the top level DPC (DPC 04) and its associated hierarchy with the lower level DPCs (DPC 041 DPC 042, and DPC 141, and DPC 142) are shown in boxes surrounded outside by a dark contrast color to illustrate the formation of a hierarchy starting from the top level and ending in a tree structure with its associated lower level DPCs.

As shown in FIG. 3, the kernel organization is hierarchical in nature. Typically, interfaces between top level system and sub-systems are invariant, to avoid changes to one sub-system leading to further modifications being required to others. Each module/sub-system in the kernel allocates and manages its own private data structures. For example, memory allocation module associated with the buffer cache may allocate and free data structures it uses to track its own internal state. Such allocation/de-allocation of the data structures are generally performed by the associated module/sub-system. Other modules/sub-systems in the kernel may refer to these data structures and not allocate/de-allocate based on their association. Such an operational hierarchy facilitates each of the modules/sub-systems monitoring its own health. The term "health" here refers to consistency of data structures.

Each module/sub-system may contain multiple types of data structures, and each data structure may have the same or a separate DPC. For example, the system page table is generally managed by virtual memory sub-systems and virtual mapping modules. Any new entry in the module/sub-system is generally created by the virtual mapping module. Other modules/sub-system may request a new entry or want to examine the contents of an entry, but the creation of the new entry is performed by the interfaces provided by the virtual mapping module.

As described-above, the present technique allows each sub-system to create and define its own DPC. This can be a top-level page class or a sub-class of an existing or new class. The dump sub-system is another sub-system that resides in the kernel that exports the page classification mechanism to the rest of the computer system.

At step 120, the computer system health condition is monitored by each one of the kernel modules/sub-systems during operation of the computer system. Generally, the computer system panic condition is called by one of the modules/sub-systems when they find it difficult to continue operation in a reliable manner. This can be due to data structure corruption, lack of sufficient resources to process a request, or an invalid/unexpected request and the like. In some embodiments, each sub-system, upon detecting a computer system panic condition, generates and sends its own panic code to the dump sub-system. The panic code may include an identifier that carries information associated with the computer system panic condition. Such an identifier can include enough contextual information associated with the panic condition to facilitate each sub-system to assess whether or not a certain DPC needs to be dumped. In some embodiments, during normal operation, each of the sub-systems in the kernel keeps track of their own health via internal monitoring mechanisms. Such health data is typically kept in each associated sub-system so that it is accessible to the dump sub-system during a computer system dump initiation.

At step 130, the method 100 determines whether any one of the modules/sub-systems has detected a computer system panic condition. The method 100 goes to step 120 if the computer system panic condition is not detected by any of the modules/sub-systems.

The method 100 goes to step 140 if one or more of the modules/sub-systems have detected the computer system panic condition. At step 140, the dump sub-system receives the panic code generated by one or more of the modules/sub-systems of the operating system upon detecting a computer system panic condition during operation. In some embodiments, the generated panic code is sent as an argument. In these embodiments, each sub-system in the kernel calls a panic condition using statically configured or dynamically configured panic code.

At step 150, a list is then created including DPCs that need to be dumped along with a set of associated callbacks. The term "callback" refers to a function handle provided by the sub-system creating a DPC to the dump sub-system. For each DPC, the sub-system creating it provides the function handle through which the dump sub-system can invoke its associated services. The dump sub-system calls each of these callbacks in step 160, specifying the associated DPC and the panic code received from the panicking sub-system. The callback provides a mechanism for the creating subsystem to check the health data of the associated sub-system and to decide whether or not a DPC needs to be dumped. This decision is then communicated to the dump sub-system by the callback.

At step 160, DPC updates are received form the callbacks via the associated modules/sub-systems. The received DPC updates are then used to update the list of DPCs created by the dump sub-system. The updated list of DPCs can result in one or more DPCs from being removed or added from the to-be-dumped list of DPCs.

At step 170, the method 100 determines whether the DPC updates have been received from all the associated callbacks. The method 100 goes to step 160, if the DPC updates have not been received from all the associated callbacks based on the determination at step 170. The method 100 goes to step 180 if the DPC updates have been received from all the associated callbacks based on the determination at step 170.

For a top-level DPC, a callback function is provided to invoke during dump time to determine when the DPCs need to be dumped. The lower-level DPCs can default to the associated top-level DPCs callback or can be assigned to a new one.

Thus, in some embodiments, each sub-system in the computer system, having an allocated DPC, monitors its own health and keeps track of any changes made to them. This can facilitate during a computer system panic condition in deciding whether or not a DPC needs to be dumped. The kernel along with each of the sub-systems passes the control to the dump sub-system upon completing the processing of the DPCs upon detecting a computer system panic condition.

The kernel can also have statically defined page classes that are created without being requested by a sub-system. These statically defined page classes may or may not have callbacks associated with them. In some embodiments, if there are any static page classes that are configured in the computer system, the dump sub-system may provide the operator with a facility to control the DPCs that can be dumped, i.e., to mark the DPCs as must, may, or not be dumped. In these embodiments, if any of the DPCs are marked as must-be-dumped, then all the associated sub-classes are also marked as must-be-dumped by default. If the DPCs are marked as not-to-bedumped, then they are removed from the dump list. For the remaining DPCs that are marked as may-be-dumped, the registered callbacks are invoked, specifying the DPC and the panic identifier arguments. In these embodiments, depending on the implementation, a callback may handle multiple registered DPCs or may handle only the one that is specified to be handled. All the registered callbacks provide information that identifies the associated DPCs. In some embodiments, a linkage may be defined between two DPCs that are not directly connected through the DPC hierarchy. This linkage serves to allow multiple callbacks to participate in making a decision as to whether or not a DPC needs to be dumped. In these embodiments, if linkages are defined, then it may lead to more than one callback being called for a DPC. In such a scenario, the decision to dump the DPCs can be a logical based operation.

In some embodiments, the sub-system, to which the callback points, verifies the consistency of the sub-system with respect to the DPC. In these embodiments, the callback may use the panic identifier, if relevant, and make a decision as to whether or not a DPC needs to be dumped. The decision to-dump or not-to-dump a DPC is returned to the dump sub-system. The dump sub-system, upon receiving the information related to each DPC as to whether to-dump or not-to-dump the DPC, proceeds with writing to the external memory, disk and/or device and subsequent re-initialization of the system during boot-up of the computer system.

At step 180, a list of DPCs that need to be dumped is formed if DPC updates have been received from all the associated callbacks based on the received DPC update. In some embodiments, the formed list of DPCs takes into account any pre-configured mandatory DPCs as described above. In some embodiments, the dump sub-system collects and collates the information received from each sub-system for a specified DPC or all its associated/linked DPCs and then builds the final list of DPCs that need to be dumped. In some embodiments, when memory pages residing in the kernel are dumped upon detecting a computer system panic condition the contents of the data structures are written to an external memory. Using the above-described techniques, the dump of memory pages consists of the private data structures allocated by the various sub-systems in the kernel. This is due to a substantial reflection in operational hierarchy of the kernel in the data structures. This allows the data structures to be assigned at each point in the hierarchy to different DPCs. Such a segmentation of the data structures allows the number of memory pages that need to be dumped to be narrowed down to only those memory pages in the kernel that are affected by the crash.

Generally, the panic code is sent by an affected sub-system in the kernel and it is safe to assume that the affected memory pages reside in the associated DPCs and data structures. Further, the DPCs are generally at a very coarse classification level, and so making a decision to-dump or not-to-dump does not require extensive computation. As described-above, it can be envisioned that some DPCs may be used by more than one sub-system in the kernel. Such DPCs may have to be dumped if the computer system panic condition is detected and called by any one of the sub-systems using them. The linking of these DPCs based on usage helps specify the virtual dependency across the kernel hierarchy. In these embodiments, the callback related to more than one sub-system may need to be called to decide whether or not a DPC needs to be dumped upon detecting a computer system panic condition.

At step 190, the memory pages associated with the formed list of DPCs are then dumped by the dump sub-system to an external memory/device. In some embodiments, the computer system reboots upon dumping the memory pages associated with the one or more DPCs to the external memory/device.

The above described technique via the DPC sub-division process can significantly reduce the number of physical memory pages that may be required to be dumped. The above technique provides a fine grained approach in terms of selecting the page classes to be dumped than what is available through static page classification technique. As the DPC structure can be made to map to the kernel hierarchy, a low level DPC belongs entirely to the sub-system that creates it and its consistency is affected and determined only by the code belonging to that sub-system. This mechanism provides an isolation approach at the DPC level. As a result, DPCs can be created and managed within a subsystem without affecting the rest of the sub-systems in the kernel. It can be envisioned that the page classification can grow as the system physical memory grows with usage and/or time. This facilitates in providing a mechanism by which the actual memory content to be dumped can be limited to only the affected areas of the memory, and makes it possible to limit the memory content to a reasonable or manageable size.

Figure 2:
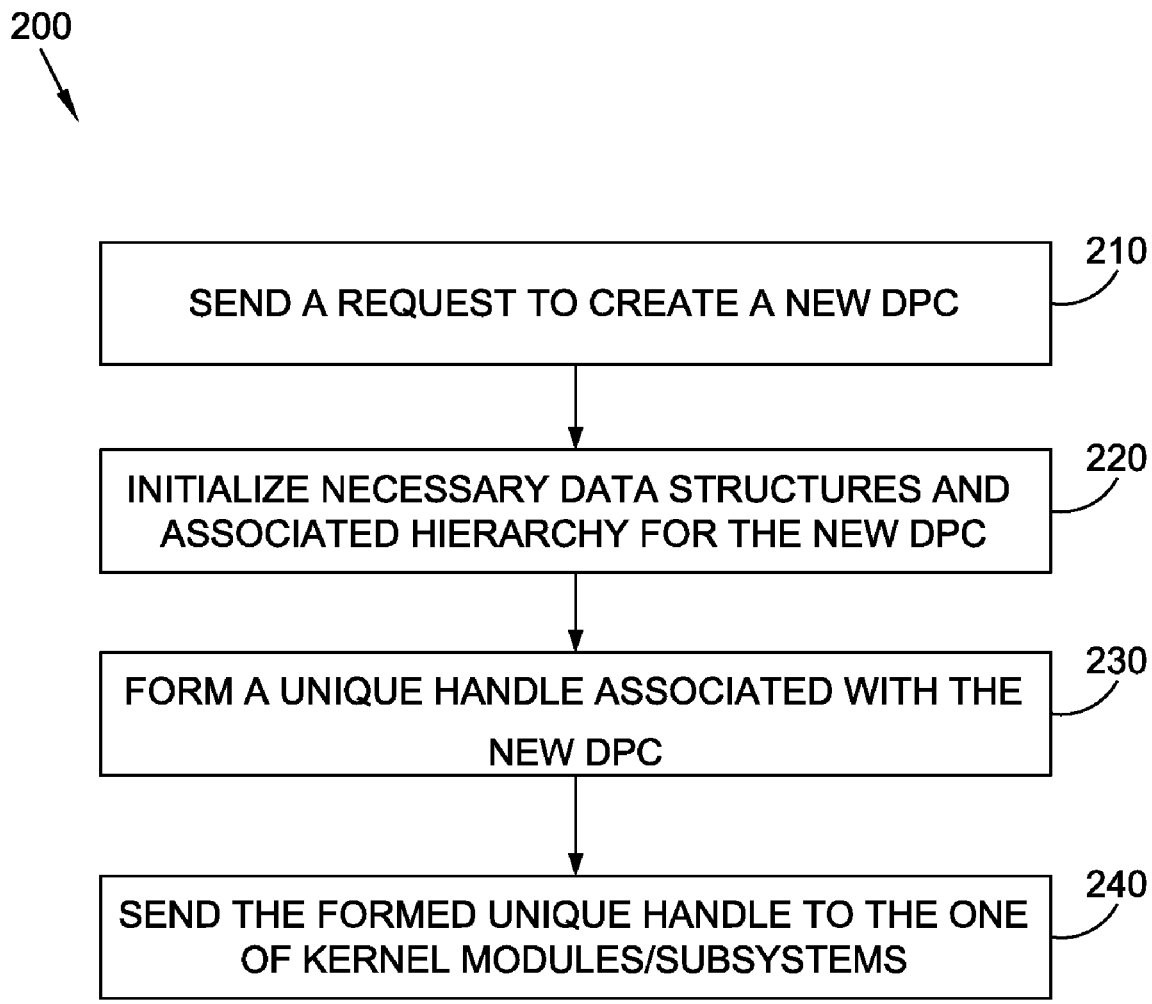
FIG. 2 is a flowchart illustrating a method for creating a new dynamic page class (DPC) according to an embodiment of the present subject matter.

FIG. 2 illustrates an example method 200 for creating a new DPC. At step 210, this example method 200 begins by sending a request to create a new DPC. In some embodiments, a new memory page is assigned to one of the DPCs by the one of kernel modules/sub-systems upon allocation of a new memory page. In these embodiments, one of the sub-systems in the kernel can request forming a new DPC based on its own internal criteria. Also in these embodiments, whenever a new memory page is allocated it is assigned to one of the existing DPCs by the sub-system. At step 220, necessary data structures and associated hierarchy are initialized for the new DPC. In these embodiments, the dump sub-system updates internal data structures to assign or remove the new memory page to the one or more DPCs.

In some embodiments, a request to create a new DPC is sent to the dump sub-system by one of the modules/sub-systems based on pre-determined criteria. In these embodiments, necessary data structures and associated hierarchy for the newly created DPC are initialized. A unique handle associated with the newly created DPC is then formed. The formed unique handle is then sent to the associated one of the modules/sub-systems. The new DPC is then created by the dump sub-system upon receiving the request from the one of the kernel modules/sub-systems. In some embodiments, the dump sub-system provides an interface so that any one of the sub-systems can request a DPC.

At step 230, a unique handle associated with the new DPC is formed. At step 240, the formed unique handle is then sent to the associated one of the kernel modules/sub-systems. In some embodiments, the dump sub-system then creates the new DPC, initializes data structures and hierarchy, and returns the unique handle to the associated DPC and sub-system. The associated sub-system then stores the unique handle for later use during dumping of the DPCs upon detecting a computer system panic condition.

In some embodiments, the dump sub-system creates appropriate internal structures to manage the newly created DPCs. A unique reference, i.e., a DPC handle, is returned to the calling sub-system for using in subsequent operations. In some embodiments, an additional link is created to associate a lower level DPC with another upper level DPC. The calling sub-system can then use the DPC handle to classify any of the memory pages it owns/controls. This classification can be registered with the dump sub-system through interfaces provided for an intended purpose. In these embodiments, the memory pages can be reclassified at any time without restriction. Further in these embodiments, the dump sub-system may not check beyond verifying the validity of the DPC. Also in these embodiments, the dump sub-system stores only the last classification of a memory page.

Although the flowcharts 100 and 200 includes steps 110-190 and 210-240, respectively, that are arranged serially in the exemplary embodiments, other embodiments of the subject matter may execute two or more steps in parallel, using multiple processors or a single processor organized as two or more virtual machines or sub-processors. Moreover, still other embodiments may implement the steps as two or more specific interconnected hardware modules with related control and data signals communicated between and through the modules, or as portions of an application-specific integrated circuit. Thus, the exemplary process flow diagrams are applicable to software, firmware, and/or hardware implementations.

Although the embodiments of the present invention are described in the context of non-distributed environment they can be very much implemented in the distributed environment as well.

Various embodiments of the present subject matter can be implemented in software, which may be run in the computing system environment 400 shown in FIG. 4 (to be described below) or in any other suitable computing environment. The embodiments of the present subject matter are operable in a number of general-purpose or special-purpose computing environments. Some computing environments include personal computers, general-purpose computers, server computers, hand-held devices (including, but not limited to, telephones and personal digital assistants (PDAs) of all types), laptop devices, multi-processors, microprocessors, set-top boxes, programmable consumer electronics, network computers, minicomputers, mainframe computers, distributed computing environments and the like to execute code stored on a computer-readable medium. The embodiments of the present subject matter may be implemented in part or in whole as machine-executable instructions, such as program modules that are executed by a computer. Generally, program modules include routines, programs, objects, components, data structures, and the like to perform particular tasks or to implement particular abstract data types. In a distributed computing environment, program modules may be located in local or remote storage devices.

Figure 4:
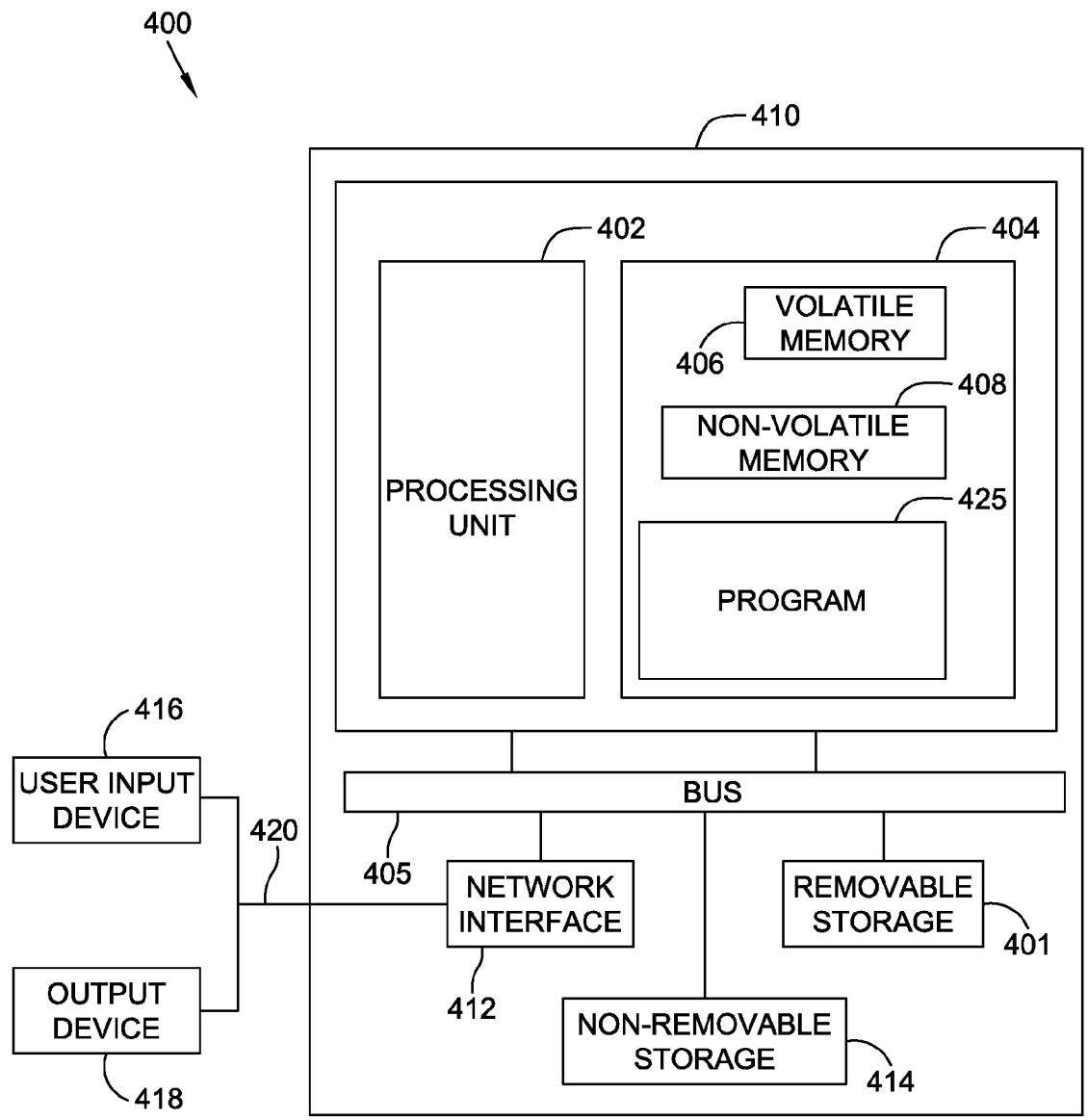
FIG. 4 is a block diagram of a typical computer system used for implementing embodiments of the present subject matter shown in FIGS. 1-3.

FIG. 4 shows an example of a suitable computing system environment 400 for implementing embodiments of the present subject matter. FIG. 4 and the following discussion are intended to provide a brief, general description of a suitable computing environment in which certain embodiments of the inventive concepts contained herein may be implemented.

A general computing device, in the form of a computer 410, may include a processor 402, memory 404, removable storage 401, and non-removable storage 414. Computer 410 additionally includes a bus 405 and a network interface 412.

Computer 410 may include or have access to a computing environment that includes one or more user input devices 416, one or more output devices 418, and one or more communication connections 420 such as a network interface card or a USB connection. The one or more output devices 418 can be a display device of computer, computer monitor, TV screen, plasma display, LCD display, display on a digitizer, display on an electronic tablet, and the like. The computer 410 may operate in a networked environment using the communication connection 420 to connect to one or more remote computers. A remote computer may include a personal computer, server, router, network PC, a peer device or other network node, and/or the like. The communication connection may include a Local Area Network (LAN), a Wide Area Network (WAN), and/or other networks.

The memory 404 may include volatile memory 406 and non-volatile memory 408. A variety of computer-readable media may be stored in and accessed from the memory elements of computer 410, such as volatile memory 406 and non-volatile memory 408, removable storage 401 and non-removable storage 414. Computer memory elements can include any suitable memory device(s) for storing data and machine-readable instructions, such as read only memory (ROM), random access memory (RAM), erasable programmable read only memory (EPROM), electrically erasable programmable read only memory (EEPROM), hard drive, removable media drive for handling compact disks (CDs), digital video disks (DVDs), diskettes, magnetic tape cartridges, memory cards, Memory Sticks™ and the like; chemical storage; biological storage; and other types of data storage.

"Processor" or "processing unit," as used herein, means any type of computational circuit, such as, but not limited to, a microprocessor, a microcontroller, a complex instruction set computing (CISC) microprocessor, a reduced instruction set computing (RISC) microprocessor, a very long instruction word (VLIW) microprocessor, explicitly parallel instruction computing (EPIC) microprocessor, a graphics processor, a digital signal processor, or any other type of processor or processing circuit. The term also includes embedded controllers, such as generic or programmable logic devices or arrays, application specific integrated circuits, single-chip computers, smart cards, and the like.

Embodiments of the present subject matter may be implemented in conjunction with program modules, including functions, procedures, data structures, application programs, etc., for performing tasks, or defining abstract data types or low-level hardware contexts.

Machine-readable instructions stored on any of the above-mentioned storage media are executable by the processing unit 402 of the computer 410. For example, a program module 425 may include machine-readable instructions capable of creating memory page classifications that can improve memory dumping efficiency according to the teachings and herein described embodiments of the present subject matter. In one embodiment, the program module 425 may be included on a CD-ROM and loaded from the CD-ROM to a hard drive in non-volatile memory 408. The machine-readable instructions cause the computer 410 to encode according to the various embodiments of the present subject matter.

The operation of the computer system 400 for recompiling executable code to improve performance is explained in more detail with reference to FIG. 1.

The above-described technique allows each module/sub-system in the kernel to create its own DPC. The created DPCs can be associated with a top level class or a sub-class of an existing or new class. There is no limit to the hierarchy of DPCs. The above process supports a multi-level hierarchy of DPCs. The above process provides a much finer grained definition of memory page classification without the overhead of rebuilding or redesigning the OS every time a page class is added. As memory size increases and/or sub-systems are able to assess their health, the above process adapts itself by dynamically increasing the number of levels. The hierarchy of the DPCs substantially map the logical or physical relationship between sub-systems so that grouping of DPCs and sharing of callbacks to improve efficiency of the dump process.

The above technique can be implemented using an apparatus controlled by a processor where the processor is provided with instructions in the form of a computer program constituting an aspect of the above technique. Such a computer program may be stored in storage medium as computer readable instructions so that the storage medium constitutes a further aspect of the present subject matter.

The above description is intended to be illustrative, and not restrictive. Many other embodiments will be apparent to those skilled in the art. The scope of the subject matter should therefore be determined by the appended claims, along with the full scope of equivalents to which such claims are entitled.

As shown herein, the present subject matter can be implemented in a number of different embodiments, including various methods, a circuit, an I/O device, a system, and an article comprising a machine-accessible medium having associated instructions.

Other embodiments will be readily apparent to those of ordinary skill in the art. The elements, algorithms, and sequence of operations can all be varied to suit particular requirements. The operations described-above with respect to the method illustrated in FIG. 1 can be performed in a different order from those shown and described herein.

FIGS. 1-4 are merely representational and are not drawn to scale. Certain proportions thereof may be exaggerated, while others may be minimized. FIGS. 1-4 illustrate various embodiments of the subject matter that can be understood and appropriately carried out by those of ordinary skill in the art.

In the foregoing detailed description of the embodiments of the invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive invention lies in less than all features of a single disclosed embodiment. Thus, the following claims are hereby incorporated into the detailed description of the embodiments of the invention, with each claim standing on its own as a separate preferred embodiment.

The invention claimed is:

1. A method for creating dynamic page classification, comprising:
    creating DPCs in a kernel by a sub-system upon computer system boot-up, wherein the kernel includes modules/sub-systems that allocate and manage the kernel;
    determining whether one or more DPCs need to be dumped upon receiving a panic code generated by one of the modules/sub-systems during operation of the computer system, wherein the one or more DPCs to be dumped are determined based on association of the one or more DPCs with the received panic code; and
    dumping memory pages associated with the one or more DPCs to an external memory by the sub-system based on the determination.

2. The method of claim 1, wherein, the sub-system comprises a dump sub-system.

3. The method of claim 2, wherein determining whether the one or more DPCs that need to be dumped upon receiving the panic code, comprises:
    receiving the panic code generated by one of the modules/sub-systems upon detecting the panic condition during system operation by the dump sub-system;
    creating a list of DPCs, along with associated callbacks based on the received panic code by the dump sub-system;
    determining whether one or more associated DPCs needs to be dumped based on the created list of DPCs along with the associated callbacks by the one of the kernel modules/sub-systems; and
    forming a list of DPCs that need to be dumped based on the determination by the dump sub-system.

4. The method of claim 3, further comprising:
    receiving DPC updates from each callback; and
    determining whether the DPC updates have been received from all the associated callbacks; and
    if so, updating the formed list of DPCs that need to be dumped based on the received DPC updates.

5. The method of claim 4, wherein dumping pages associated with the one or more DPCs to the external memory further comprises:
    copying contents of memory to the external memory or a device by the dump sub-system upon detecting the computer system panic condition.

6. The method of claim 1, further comprising:
    sending a request, to create a new DPC, to the dump sub-system by one of the modules/sub-systems based on pre-determined criteria; and
    creating the new DPC by the dump sub-system upon receiving the request from the one of the kernel modules/sub-systems.

7. The method of claim 6, wherein creating the new DPC comprises:
    initializing necessary data structures and associated hierarchy for the new DPC;
    forming a unique handle associated with the new DPC; and
    sending the formed unique handle to the associated one of kernel modules/sub-systems.

8. The method of claim 1, further comprising:
    assigning the new memory page to one of the DPCs by the one of the kernel modules/sub-systems upon allocation of a new memory page; and
    updating internal data structures to assign or remove the new memory page to the one of the DPCs by the dump sub-system.

9. The method of claim 1, further comprising:
    monitoring the computer system panic condition by each one of the kernel modules/sub-systems during operation of the computer system.

10. The method of claim 1, wherein creating the DPCs comprises:
    creating the DPCs such that the DPCs substantially map to kernel modules/sub-systems.

11. An article comprising:
    a storage medium having instructions, that when executed by a computing platform, result in execution of a method for reducing non-local access for dynamic page classification comprising:
    creating DPCs in a kernel by a dump sub-system upon computer system boot-up, wherein the kernel includes modules/sub-systems that allocate and manage the kernel;
    determining whether one or more DPCs need to be dumped upon receiving a panic code generated by one of the kernel modules/sub-systems during operation of the computer system, wherein the one or more DPCs to be dumped are determined based on association of the one or more DPCs with the received panic code; and
    dumping pages associated with the one or more DPCs to an external memory by the dump sub-system based on the determination.

12. The article of claim 11, wherein determining whether the one or more DPCs that need to be dumped upon receiving the panic code, comprises:
- receiving the panic code generated by one of the modules/sub-systems upon detecting the panic condition during system operation by the dump sub-system; creating a list of DPCs, along with associated callbacks based on the received panic code by the dump sub-system;
- determining whether one or more associated DPCs need to be dumped based on the created list of DPCs along with the associated callbacks by the one of the kernel modules/sub-systems; and
- forming a list of DPCs that need to be dumped based on the determination by the dump sub-system.

13. The article of claim 12, further comprising:
receiving DPC updates from each callback; and
determining whether the DPC updates have been received from all the associated callbacks; and
if so, updating the formed list of DPCs that needs to be dumped based on the received DPC updates.

14. The article of claim 12, wherein dumping pages associated with the one or more DPCs to the external memory further comprises:
- copying contents of memory to the external memory or a device by the dump sub-system upon detecting the computer system panic condition.

15. The method of claim 11, wherein creating the DPCs comprises:
- creating the DPCs such that the DPCs substantially map to kernel modules/sub-systems.

16. A computer system comprising:
a processing unit; and
a memory coupled to the processor, the memory having stored therein code for creating memory page classification, the code causes the processor to perform a method comprising:
- creating DPCs in a kernel by a dump sub-system upon computer system boot-up, wherein the kernel includes modules/sub-systems that allocate and manage the kernel;
- determining whether one or more DPCs need to be dumped upon receiving a panic code generated by one of the kernel modules/sub-systems during operation of the computer system, wherein the one or more DPCs to be dumped are determined based on association of the one or more DPCs with the received panic code; and
- dumping pages associated with the one or more DPCs to an external memory by the dump sub-system based on the determination.

17. The system of claim 16, wherein determining whether the one or more DPCs that needs to be dumped upon receiving the panic code, comprises:
- receiving the panic code generated by one of the modules/sub-systems upon detecting the panic condition during system operation by the dump sub-system;
- creating a list of DPCs, along with associated callbacks based on the received panic code by the dump sub-system;
- determining whether one or more associated DPCs need to be dumped based on the created list of DPCs along with the associated callbacks by the one of the kernel modules/sub-systems; and
- forming a list of DPCs that needs to be dumped based on the determination by the dump sub-system.

18. The system of claim 17, further comprising:
receiving DPC updates from each callback; and
determining whether the DPC updates have been received from all the associated callbacks; and
if so, updating the formed list of DPCs that need to be dumped based on the received DPC updates.

19. The article of claim 18, wherein dumping pages associated with the one or more DPCs to the external memory further comprises:
- copying contents of memory to the external memory or a device by the dump sub-system upon detecting the computer system panic condition.

20. The method of claim 16, wherein creating the DPCs comprises:
- creating the DPCs such that the DPCs substantially map to kernel modules/sub-systems.

* * * * *